(12) United States Patent
Martin et al.

(10) Patent No.: US 6,427,097 B1
(45) Date of Patent: Jul. 30, 2002

(54) CONVEYOR AUTOSET LAYBOY MACHINE

(75) Inventors: Merrill D. Martin, Oakland; Daniel J. Talken, Lafayette, both of CA (US)

(73) Assignee: Martin Family Trust

( * ) Notice: Subject to any disclaimer, the term of this patent is extended or adjusted under 35 U.S.C. 154(b) by 137 days.

(21) Appl. No.: 09/670,936

(22) Filed: Sep. 26, 2000

(51) Int. Cl.[7] ............................................... G06F 7/00
(52) U.S. Cl. .................. 700/230; 198/456; 198/457.03; 271/200
(58) Field of Search ................................ 700/213, 230; 198/456, 457.03, 458, 436, 437, 597; 271/198, 200

(56) References Cited

U.S. PATENT DOCUMENTS 2,745,538 A * 5/1956 Lamb .................... 198/457.03
3,860,232 A   1/1975 Martin
5,026,249 A   6/1991 Shill
5,178,383 A * 1/1993 Moser et al. ................ 271/299

* cited by examiner

Primary Examiner—Christopher P. Ellis
Assistant Examiner—Khoi H. Tran
(74) Attorney, Agent, or Firm—James R. Cypher; Charles R. Cypher

(57) ABSTRACT

A layboy machine for conveying and selectively varying the lateral spacing between sheets such as sheets of corrugated board. The machine is provided with controlled tugs which automatically, precisely and quickly reposition the conveyors in the machine for different sizes of outputs from a cutter in a corrugator line and different numbers of sheets in each output.

16 Claims, 19 Drawing Sheets

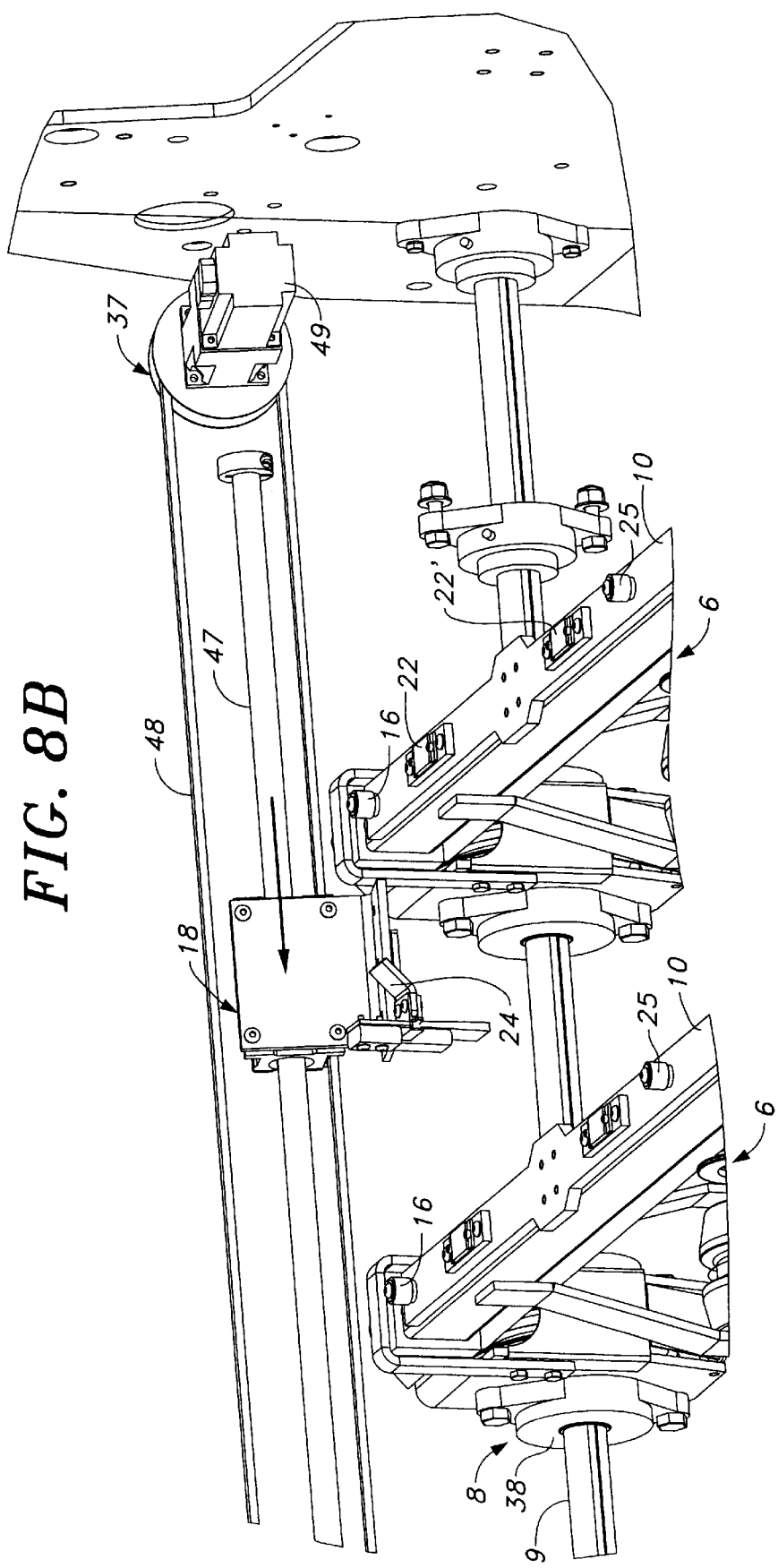

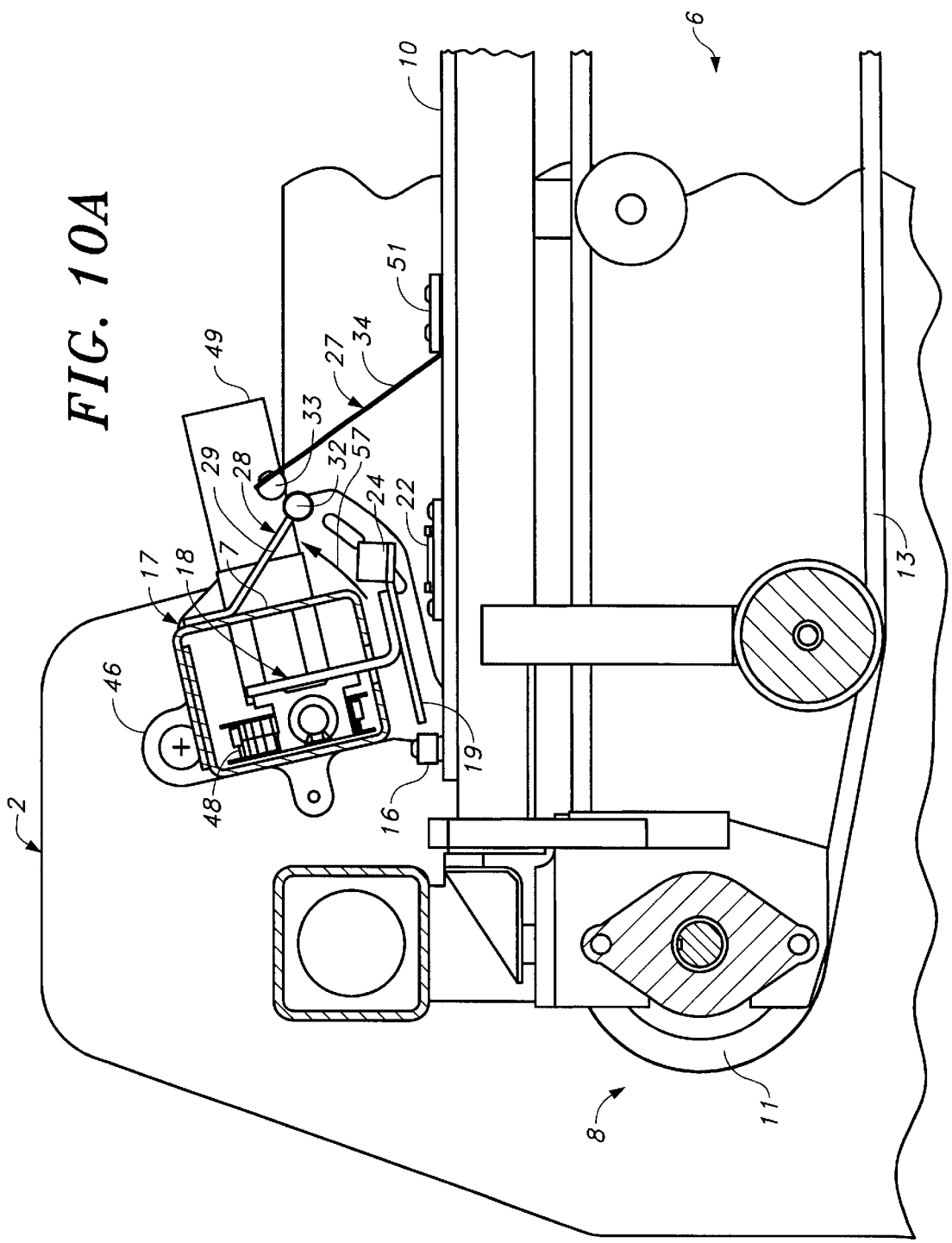

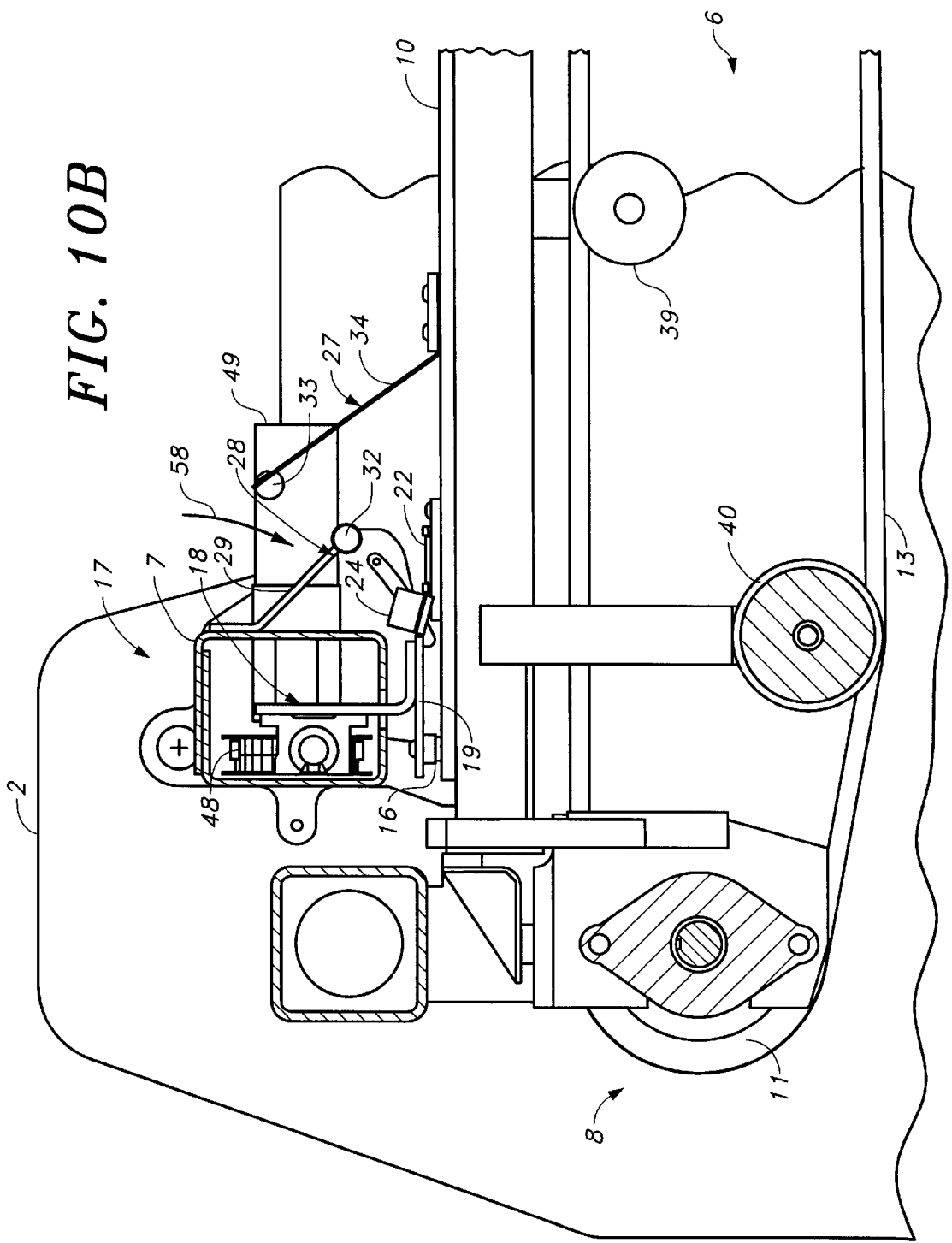

US 6,427,097 B1

CONVEYOR AUTOSET LAYBOY MACHINE

BACKGROUND OF THE INVENTION

This invention relates to a system for automatically setting the spacing and longitudinal direction of at least one of two elongated members such as the spacing and longitudinal direction of conveyors. An example of one use of such a system is in the setting of spacing and direction of conveyors in a layboy machine.

Layboy machines, as used in the corrugated board handling industry, laterally separate multiple out cuts from a rotary die cutter to a stacker. A manually adjustable layboy is described in Martin U.S. Pat. No. 3,860,232. Manually adjusting the spacing and direction of the multiple conveyors in layboy machines is tedious and time consuming thereby resulting in loss of production due to down time of the entire production line while the layboy machine is adjusted.

SUMMARY OF THE INVENTION

The primary object of the invention is to provide a conveyor autoset in a machine such as a layboy which can be preprogrammed in a computer controller means and after selection, automatically adjust the elements of the machine to carry out the selected program.

Another object is to reduce production line down time for change order layboy adjustments.

A further object is to reduce labor costs for change order layboy adjustments.

A further object is to provide a precise autoset system which eliminates down time normally required in fine tuning after manual adjustment of prior layboy machines.

Still another object is to provide a control system which can permit a centralized adjustment control system remote from the layboy machine.

A still further object is to provide a machine which reduces production costs by permitting the use of less skilled machine operators.

Another object of the present autoset layboy machine is that it provides scrap removal which deck separation machines do not.

Still another object is to provide an autoset layboy machine which requires no more factory floor space than standard manual adjustment layboy machines and will fit into present production lines.

DESCRIPTION OF THE DRAWINGS

FIG. 8B is an enlarged perspective view of the top level assembly as illustrated in FIG. 8A showing the laterally movable carriage in a different position.

FIG. 10A is an enlarged side view of a portion of a conveyor shown in FIG. 10 showing the lock means on a tug assembly approaching locking engagement with the lock means on one of the conveyors.

FIG. 10B is an enlarged side view of the portion of a conveyor shown in FIG. 10A showing a tug assembly pivotally rotated to a non locking out of engagement position with the lock means on one of the conveyors.

DESCRIPTION OF THE INVENTION

Figure 12:
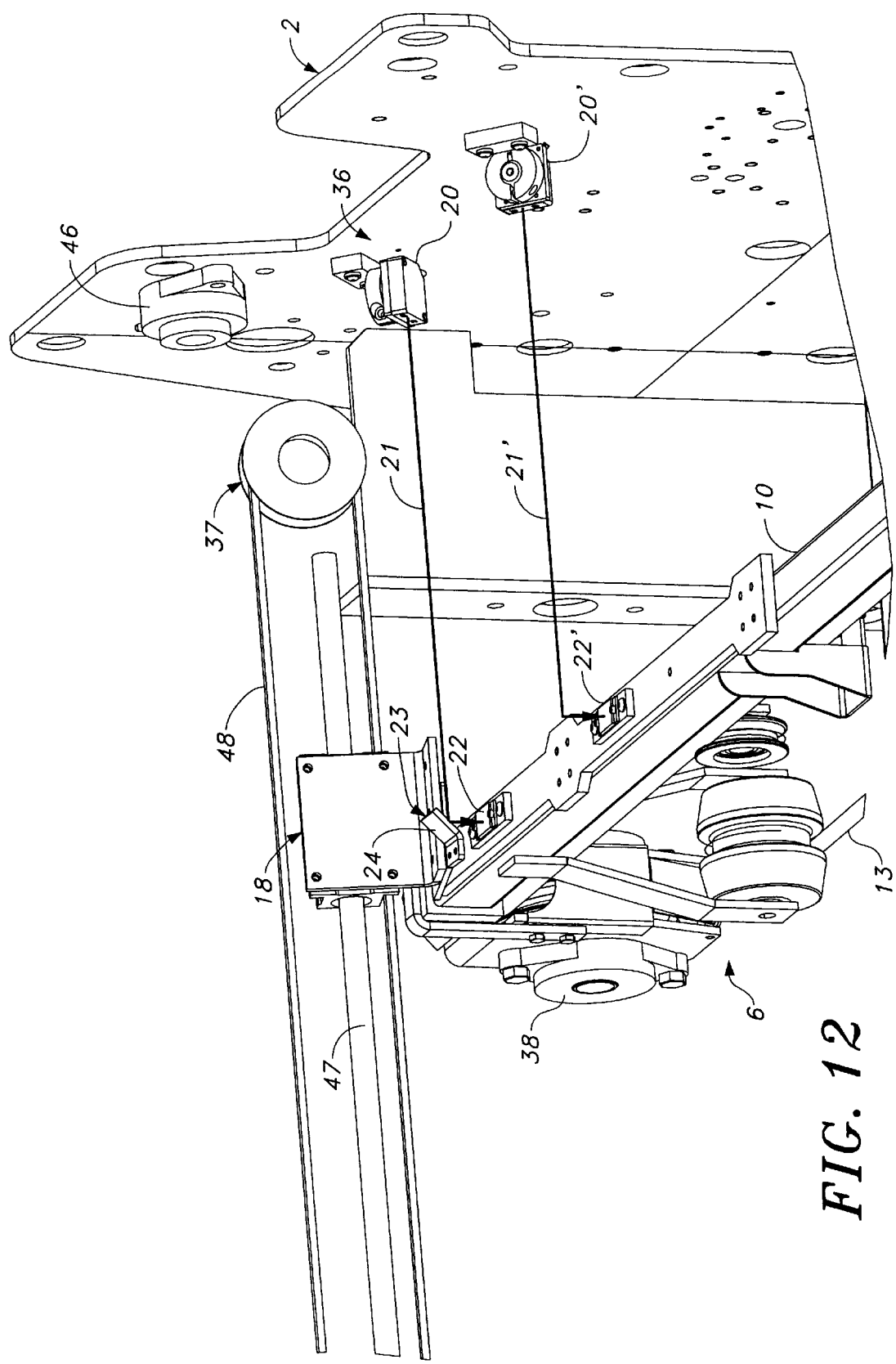
FIG. 12 is a perspective view of a portion of a conveyor illustrated in FIG. 11 with solid lines indicating the light paths from the photo eyes mounted on the frame to the reflectors and targets mounted on a conveyor.
Figure 16:
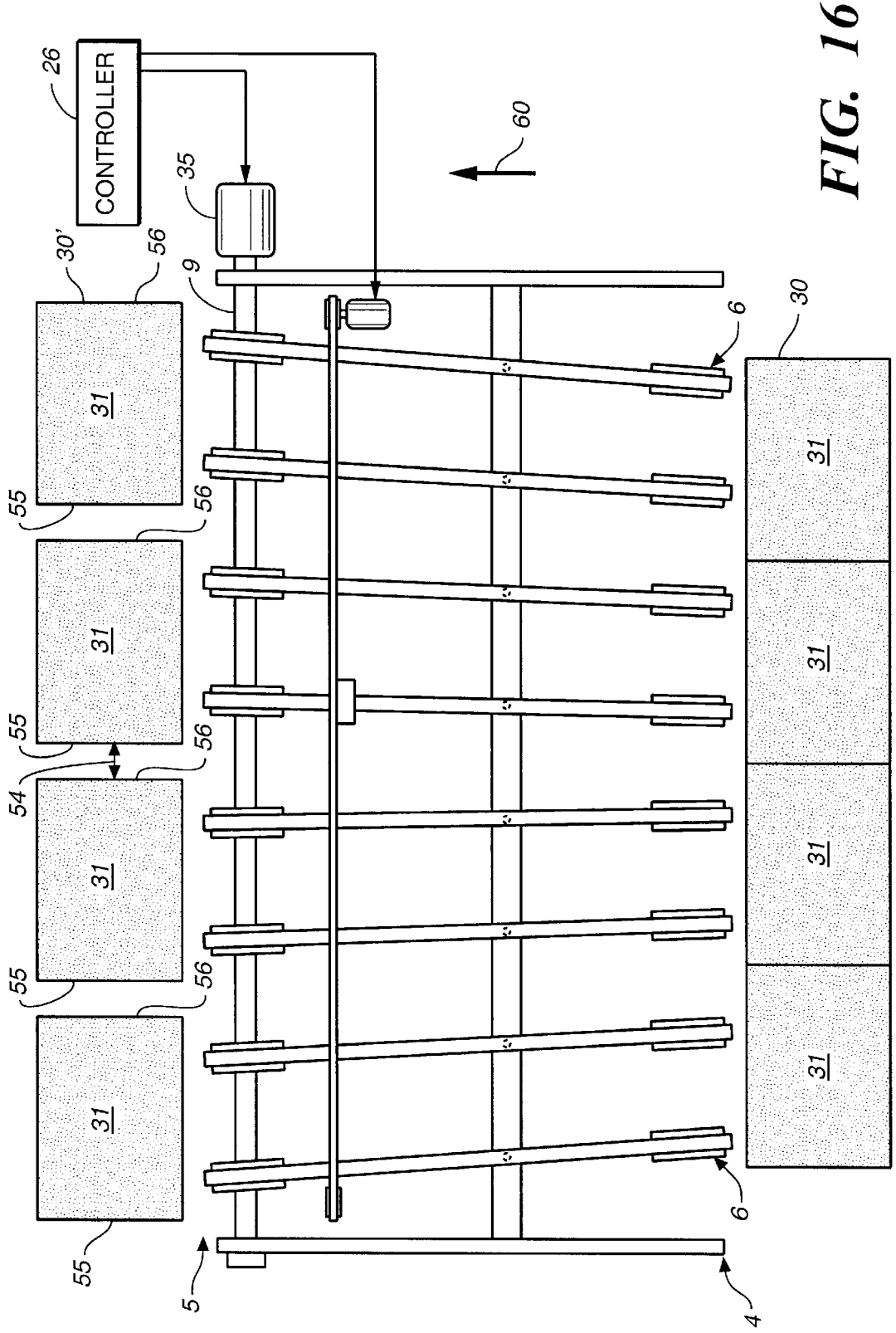
FIG. 16 is an overhead schematic view of the machine of the present invention illustrated in FIG. 1 illustrating the function of the machine in laterally separating multiple cardboard out cut sheets from a rotary die cutter.

In the present invention, a conveyor autoset layboy machine 1 is provided for receiving a stream of rows 30 of adjacent sheets 31 having side edges 55 and 56, such as cardboard, and selectively displaces the sheets 31 laterally one from another to laterally displaced sheets 31 in rows 30' while conveying the sheets 31 longitudinally of the layboy machine 1. The layboy machine 1 includes: a frame 2, conveying means 3 on the frame 2 having a receiving end 4 and a delivery end 5; the conveying means 3 including a plurality of conveyors 6 spaced side by side to carry the sheets 31, each having side edges 55 and 56, longitudinally from the receiving end 4 to the delivery end 5 and means 9 driven by a motor 35 to drive the conveyors 6. The improvement is a computer controller means for changing the lateral spacing between each of the conveyors 6 and for changing the longitudinal direction of each of the conveyors 6 for changing the lateral spacing 54 between the sheets 31 in each row 30 comprising the following elements. A locating means 36, illustrated in FIG. 12, is provided for locating and noting the first location and first longitudinal direction of each of the conveyors 6. In addition, a computer controller means 26, shown in FIG. 16 is provided for noting the first locations and the first directions of the conveyors 6 and for receiving a set of instructions. Having received the instructions, the computer controls the movement of each of the conveyors 6 to selected second locations and second longitudinal directions. The computer controller means 26 sends instructions to a first tug means 17 operably connected to the computer controller means 26 and moves the conveyors 6 to the selected second locations and second longitudinal directions.

Figure 1:
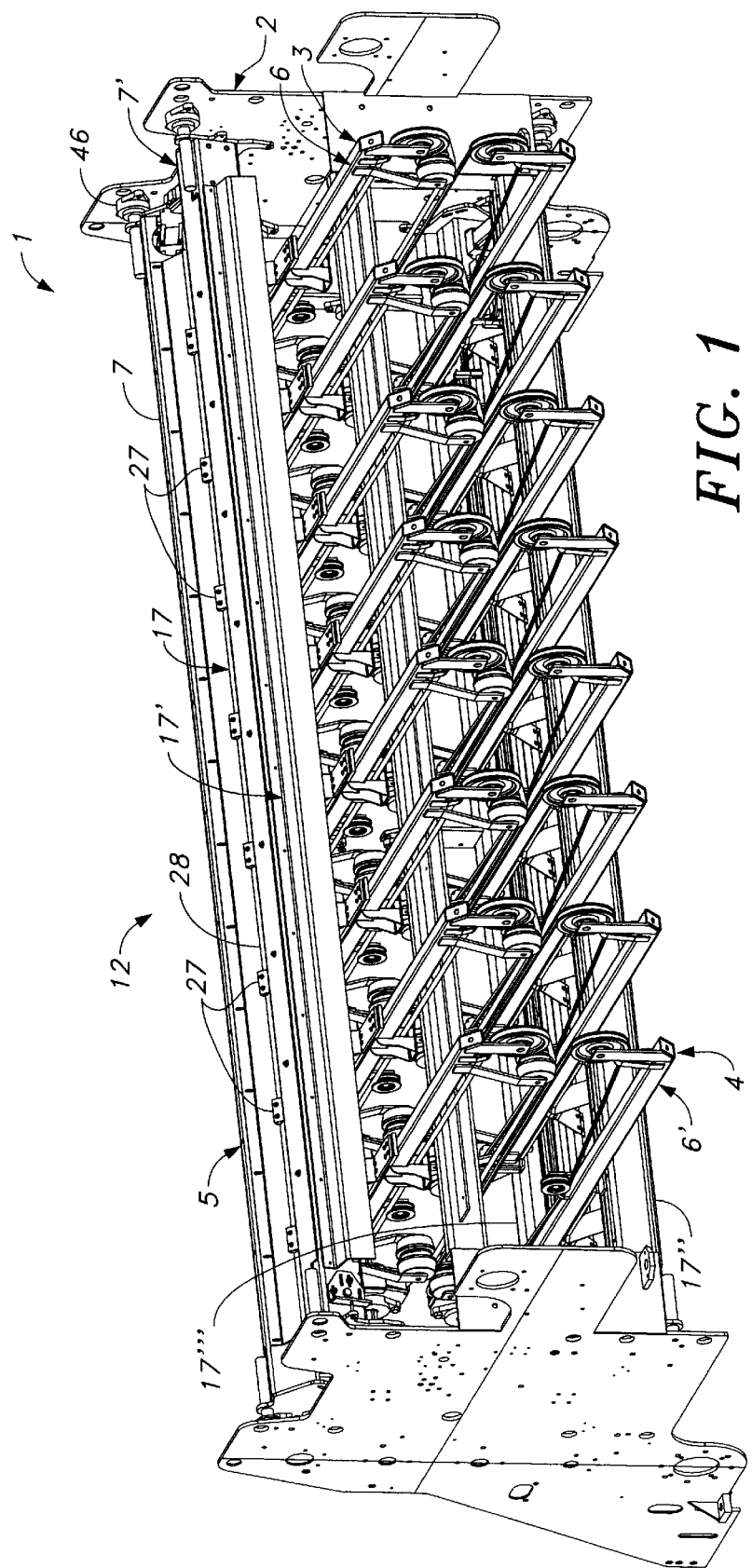
FIG. 1 is a perspective view of the top level assembly of a conveyor autoset of the present invention in a layboy machine.
Figure 10:
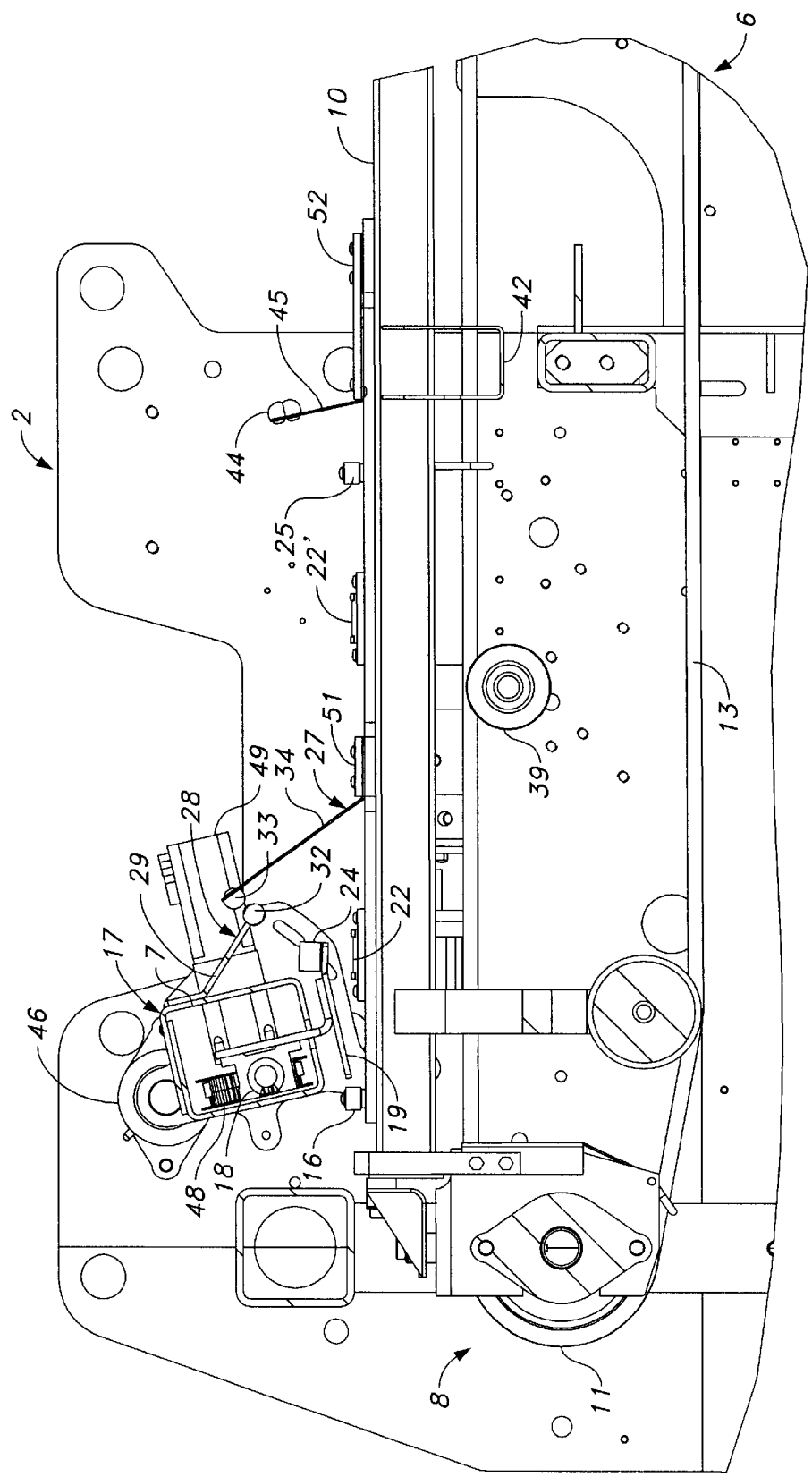
FIG. 10 is a side view of a portion of a conveyor and tug assembly illustrated in FIG. 6.

The conveyor autoset layboy machine 1 as above described includes tug means 12, as shown in FIG. 1, including a first tug assembly 17 including a first carrier 7 operably connected to the frame 2; lock means 27, (see FIGS. 10, 10A and 10B) mounted on each of the conveyors 6, and latch means 28 mounted on the first carrier 7 positioned for releasable locking engagement with the lock means 27 mounted on each of the conveyors 6 upon movement of the first carrier 7 from an unlocked position to a locked position as shown by arrow 57 in FIG. 10A.

In a preferred form, the conveyor autoset layboy machine 1 as described above is designed so that the first carrier 7 is pivotally connected to the frame 2 as best shown in FIGS. 1, 10, 10A, 10B, and 11.

A feature of the conveyor autoset layboy machine 1 of the present invention as best shown in FIG. 12 is the locating means 36 which includes a first photo eye 20 mounted on the frame 2 projecting a first photo beam 21 laterally of the plurality of conveyors 6; a first reflector target 22 mounted on each of the conveyors 6; and first directing means 23 selectively directing the first photo beam 21 at each of the first reflector targets 22. The first directing means 23 may be a mirror 24.

Figure 6:
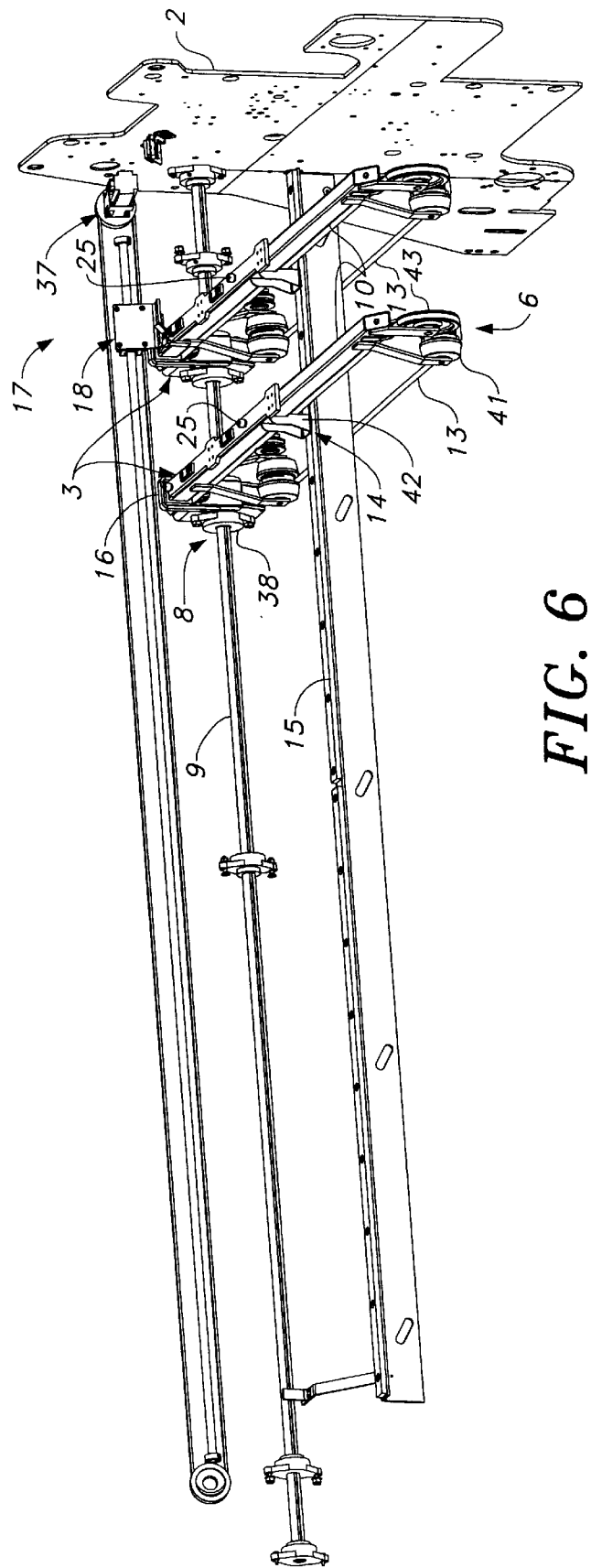
FIG. 6 is a perspective view of a portion of the top level assembly illustrated in the previous drawings. The laser, traveling mirror assembly and conveyor mounted reflectors are specifically featured.
Figure 7:
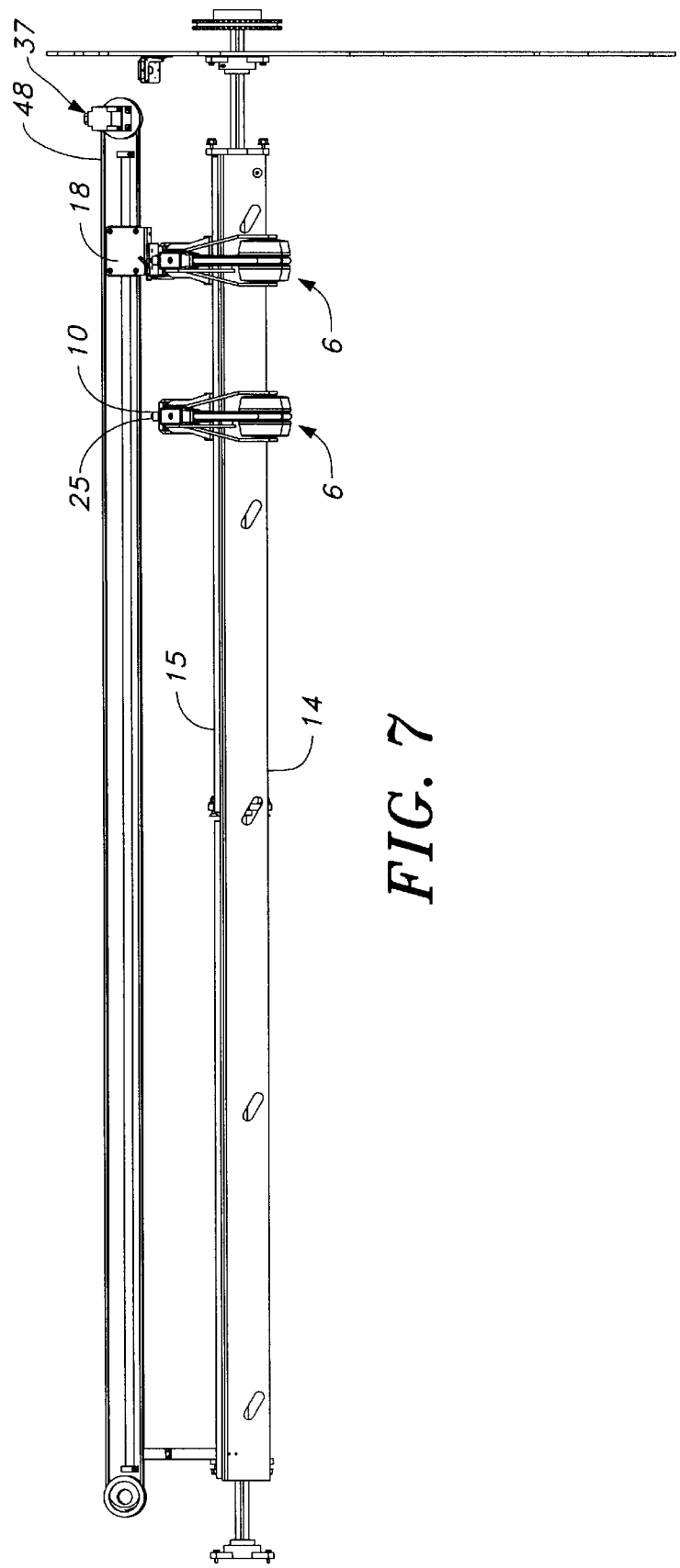
FIG. 7 is a front view of the portions of the machine illustrated in FIG. 6.

In a preferred form of construction of the conveyor autoset layboy machine 1 as above described the first tug assembly 17 includes a laterally movable first carriage 18; a first engagement member 16 is mounted on each of the conveyors 6; first gripper means 19 are mounted on the first carriage 18 for releasable selective engagement of the first engagement member 16 of the conveyors 6; and mounting means 14, as shown in FIG. 6, slidably support the conveyors 6.

The conveyors of the conveyor autoset layboy machine 1 as described may be constructed in various ways. One form of construction is illustrated in FIG. 6 in which mounting means 14 includes a drive shaft 9 to power the conveyors 6; and the conveyors 6 include an adjustable mounting means 8 operably connected to the drive shaft 9 permitting angular directional movement of the conveyors 6.

Figure 2:
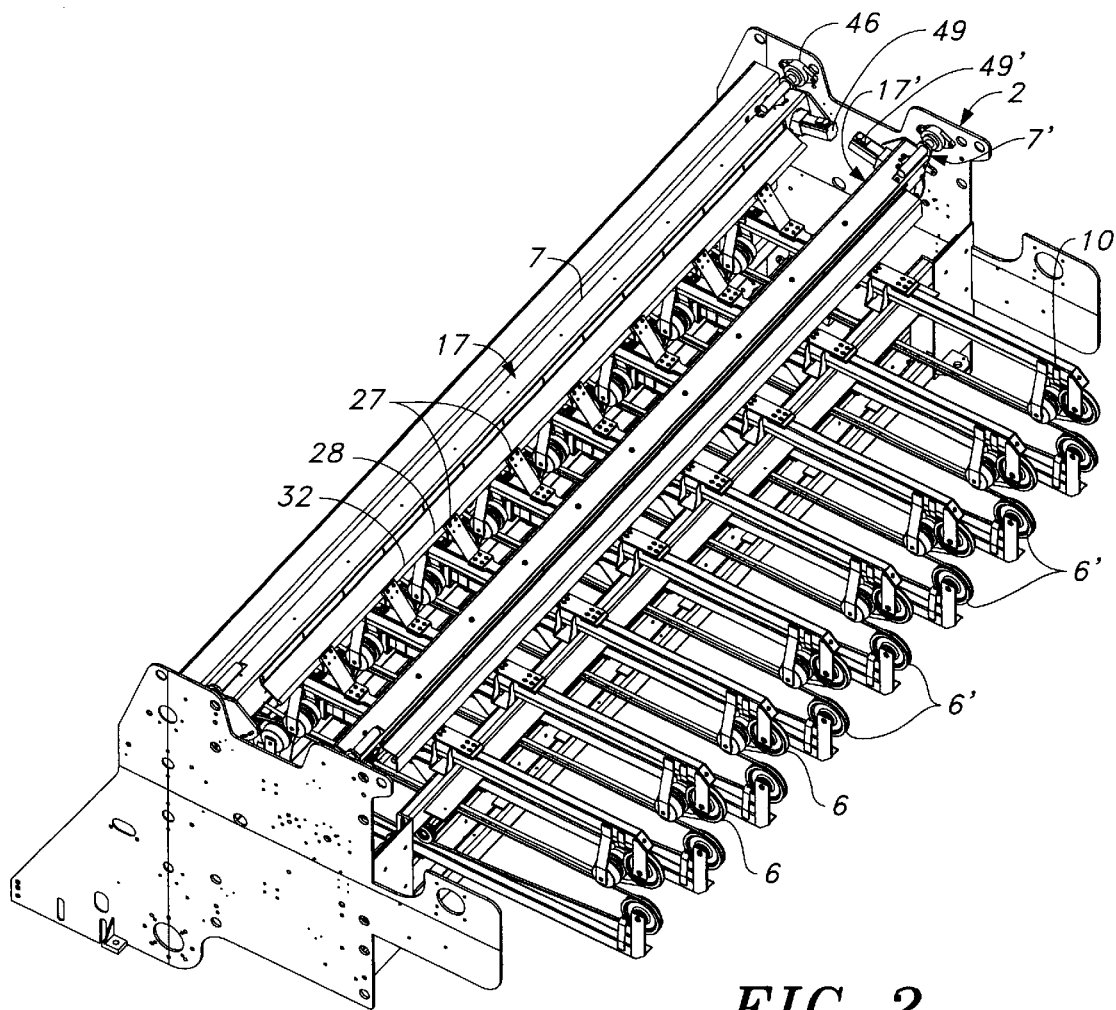
FIG. 2 is a reduced scale perspective view of the autoset layboy shown in FIG. 1 taken from an offset overhead vantage point.
Figure 3:
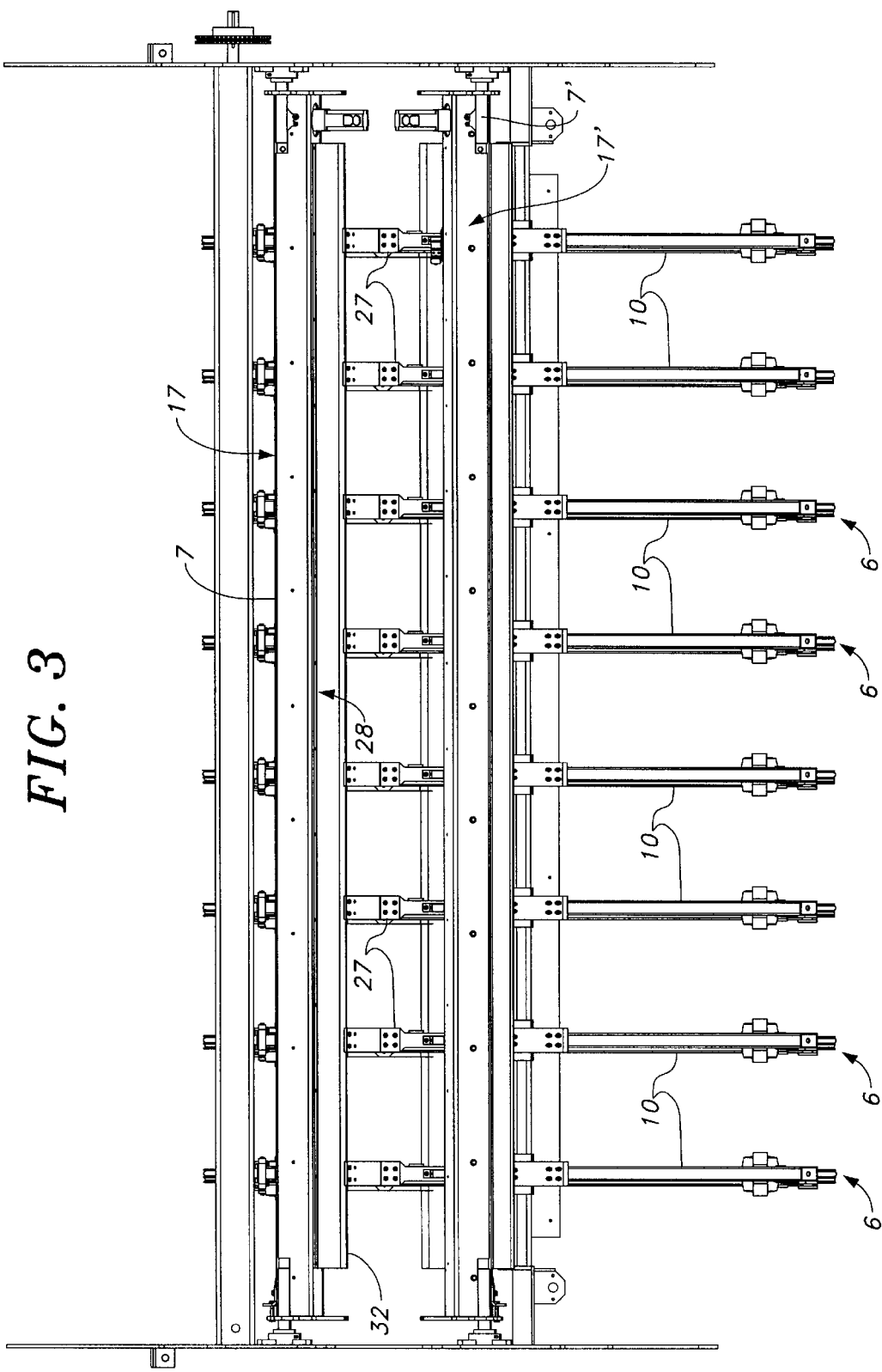
FIG. 3 is a top view of the autoset layboy shown in FIGS. 1 and 2 with portions of the machine removed for clarity of understanding of the operation of the machine.
Figure 4:
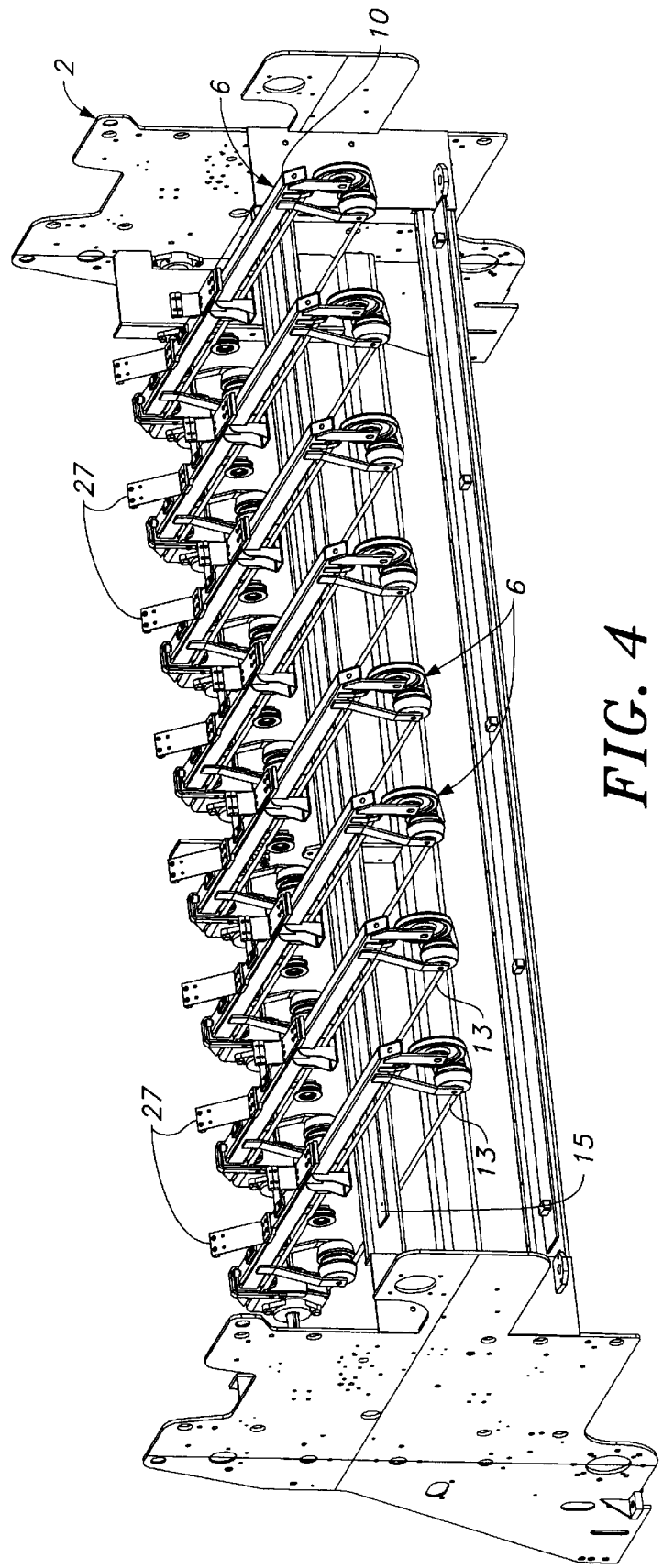
FIG. 4 is a reduced perspective view of the top level assembly of the autoset layboy with portions of the machine removed for clarity of understanding. The lower level assembly including the lower conveyor arms and their conveyor belts and pulleys have been removed.
Figure 5:
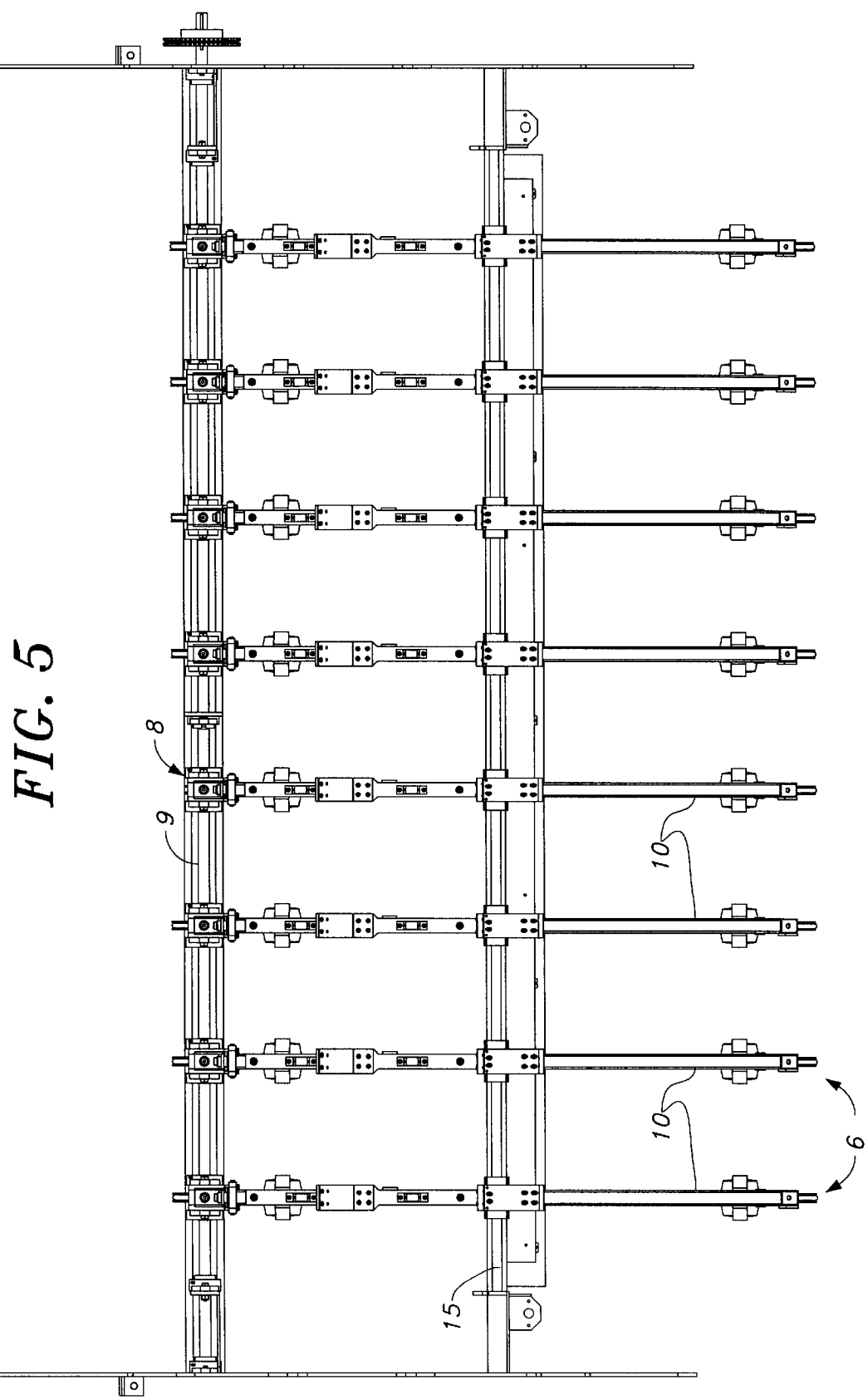
FIG. 5 is a top plan view of the portion of the top level assembly illustrated in FIG. 4.

In a preferred form, as best illustrated in FIGS. 1, 2, and 3, the conveyor autoset layboy machine 1 as previously described includes a second tug assembly 17' longitudinally spaced from the first tug assembly 17 and operably connected to the computer controller means 26. The second tug assembly 17' includes a laterally movable second carriage, similar to first carriage 18, and a second engagement member 25 mounted on each of the conveyors and spaced from the first engagement member 16. A second gripper means, similar to first gripper means 19, is mounted on the second carriage for releasable engagement of the second engagement member 25.

The conveyor autoset layboy machine 1 as previously described preferably is constructed so that the first tug assembly 17 includes a first carrier 7, operably and pivotally connected to the frame 2; the second tug assembly 17' includes a second carrier 7' operably and pivotally connected to the frame 2; and the first tug assembly 17 includes first drive means 37 and a second tug assembly similar to first tug assembly 17, as illustrated in FIGS. 6, 7, 8A, and 8B for reciprocally moving first carriage 18 and the second carriage laterally of the conveyors 6.

In the preferred form, the conveyor autoset layboy machine 1 as previously described is constructed as best illustrated in FIG. 12 wherein the locating means 36 includes a first photo eye 20 mounted on the frame 2 projecting a first photo beam 21 laterally of the plurality of conveyors 6; and a second photo eye 20' mounted on the frame 2 and longitudinally spaced from the first photo eye 20 projecting a second photo beam 21' laterally of the plurality of conveyors 6; a first reflector target 22 mounted on each of the conveyors 6 and a second reflector target 22' mounted on each of the conveyors 6 longitudinally spaced from the first reflector targets 22; a first mirror 24 mounted on the first carriage 18 reflecting the first photo beam 21 from the first photo eye 20 to the first reflector target 22 mounted on the conveyor 6; and a second directing means such as second mirror similar to first mirror 24 illustrated in FIGS. 8A, 8B, 10, 10A, 10B, 11, and 12 mounted on the second carriage reflecting the second photo beam 21' from the second photo eye 20' to the second reflector target 22' mounted on the conveyor 6.

Preferably conveyor autoset layboy machine 1 is constructed so that mounting means 14 for slidably supporting the conveyors 6 includes a drive shaft 9 to power the conveyors 6; conveyors 6 include an adjustable mounting means 8 operably connected to the drive shaft 9 permitting angular directional movement of the conveyors 6; a sliding support 15 is longitudinally spaced from the drive shaft 9 for supporting the distal ends of the conveyors 6; the first tug assembly 17 includes a first carrier 7 pivotally connected to the frame 2; the second tug assembly 17' includes a second carrier 7' pivotally connected to the frame 2; lock means 27 is mounted on each of the conveyors 6; and latch means 28 is mounted on the first and second carriers 7 and 7' positioned for releasable locking engagement with the lock means 27 mounted on each of the conveyors 6 upon movement of the first and second carriers 7 and 7' from an unlocked position to a locked position. As shown in FIG. 10B, first carrier 7 has moved latch means 28 from a locked position to an unlocked position as shown by the direction of arrow 58.

As best shown in FIGS. 1, 5, 7, and 15, the conveyor autoset layboy machine 1 of the present invention is constructed so that the conveying means 3 includes a plurality of upper level conveyors 6 spaced side by side and a plurality of lower level conveyors 6' spaced side by side arranged in registration with one another to carry the sheets 31 therebetween with each level of conveyors 6 and 6' including locating means 36 locating and signaling the first location of each of the conveyors 6 and 6' operatively connected to the computer controller means 26 for noting the first location of each of the conveyors 6 and 6', for receiving a set of instructions, and for controlling the movement of each of the conveyors 6 and 6' to selected second locations; the first tug assembly 17 is operably connected to the computer controller means 26 for moving each of the conveyors 6 and 6' to the selected second locations.

Conveyor autoset layboy machine 1 is further constructed so that each level of conveyors 6 and 6' includes: a first tug assembly 17 at each level with a laterally movable first carriage 18. The machine further includes: a first engagement member 16 mounted on each of the conveyors 6; first gripper means 19 mounted on the first carriage 18 for releasable selective engagement of the first engagement member 16 of the conveyors 6; mounting means 14 for slidably supporting the conveyors 6 of the upper and lower levels; a second tug assembly 17' at the upper and lower levels longitudinally spaced from the first tug assembly 17 of each of the levels and operably connected to the computer controller means 26; second tug assembly 17' at each level including a laterally movable second carriage; a second engagement member 25 mounted on each of the conveyors 6 and spaced from the first engagement member 16; and second gripper means mounted on the second carriage for releasable engagement of the second engagement member 25.

In a preferred construction of the conveyor autoset layboy machine 1 of the present invention, each level of conveyors 6 is constructed so that the first tug assembly 17 includes a first carrier 7 pivotally connected to the frame 2; the second tug assembly 17' includes a second carrier 7' operably connected to the frame 2 and is pivotally connected to the frame 2; the first tug assembly 17 includes drive means 37 and the second tug assembly 17' includes the second drive means for reciprocally moving the first carriage 18 and the second carriage laterally of the conveyors 6; the locating means 36 at each of the levels includes a first photo eye 20 mounted on the frame 2 projecting a first photo beam 21 laterally of the plurality of conveyors 6; a second photo eye 20' is provided at each of the levels mounted on the frame 2 and is longitudinally spaced from the first respective photo eyes 20 projecting second photo beams 21' laterally of the plurality of conveyors 6; a first reflector target 22 is mounted on each of the conveyors 6 at each of the levels and a second reflector target 22' is mounted on each of the conveyors 6 at each of the levels longitudinally spaced from the first reflector targets 22; a first mirror 24 is mounted on the first carriage 18 at each of the levels reflecting the respective first photo beams 21 from the first photo eyes 20 to the first respective reflector targets 22 mounted on each of the conveyors 6; and a second mirror, similar to first mirror 24 illustrated in FIGS. 8A, 8B, 10, 10A, 10B, 11, and 12 is mounted on the second carriage of each of the levels reflecting the second respective photo beams 21' from each of the second photo eyes 20' to the second respective reflector targets 22' mounted on the conveyors 6.

Figure 14:
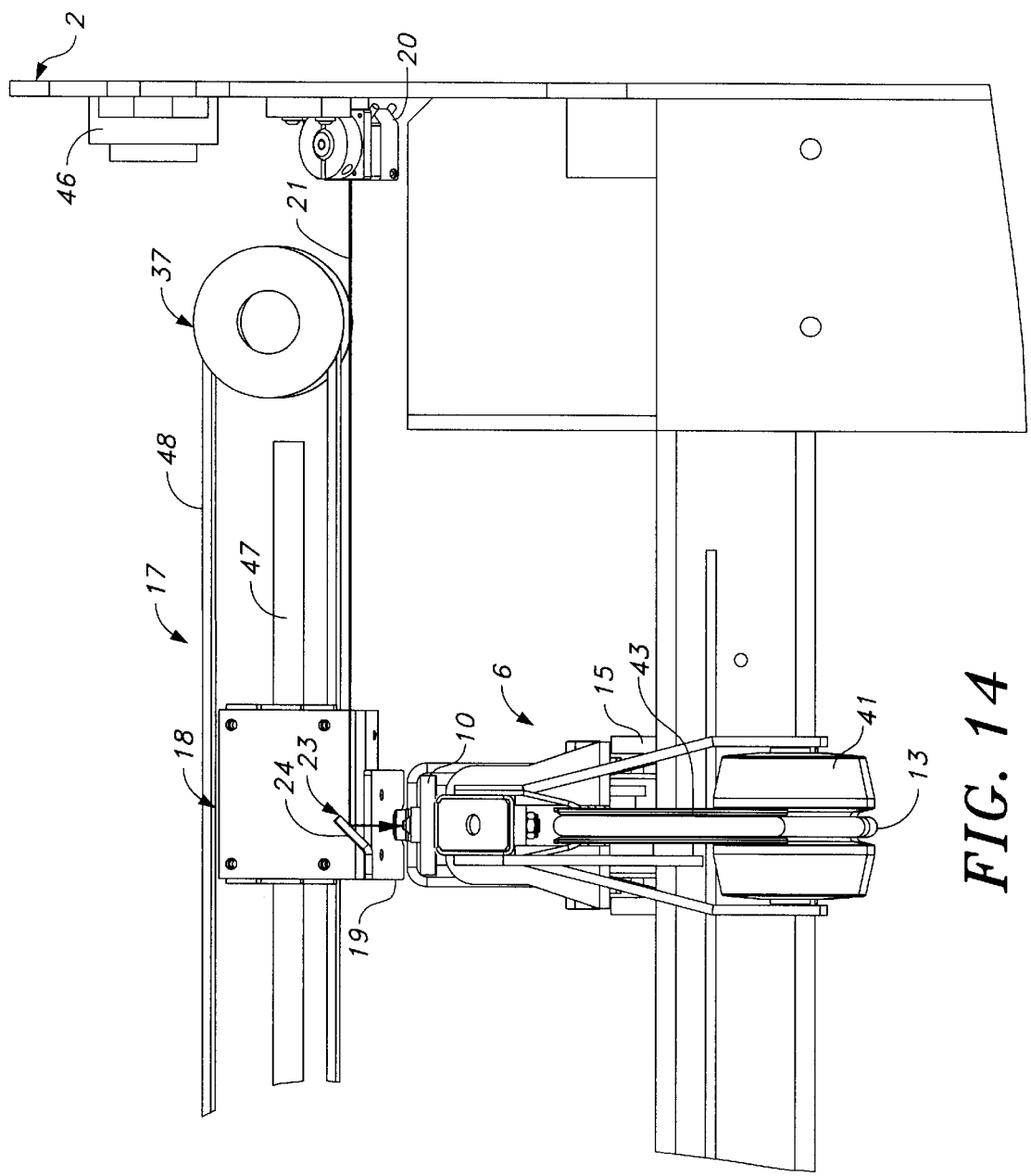
FIG. 14 is a front elevation view of a portion of a tug assembly and conveyor 6 illustrated in FIG. 13.
Figure 15:
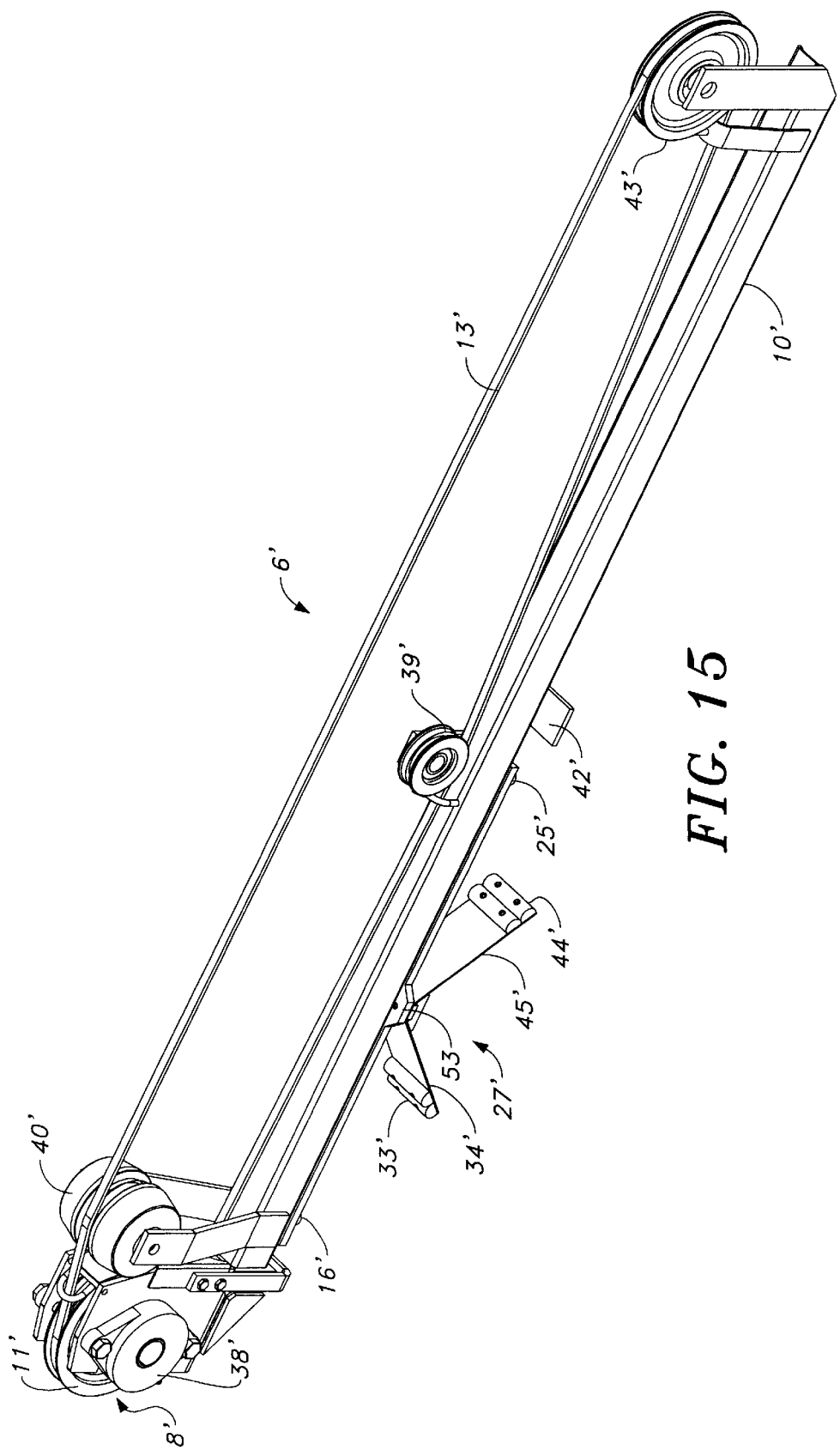
FIG. 15 is a perspective view of a lower conveyor of the machine illustrated in FIG. 1.

In a preferred form of the conveyor autoset layboy machine 1 as illustrated in FIGS. 1, 14, and 15, each of the conveyors 6 of at least one of the levels includes belting 13 having a generally circular cross section; and the belting 13 of the conveyors 6 of one of the levels is positioned with respect to the belting of the respective conveyors of the other of the levels to be offset and slightly overlapping so as to tightly grip the sheets 31 being conveyed.

Figure 11:
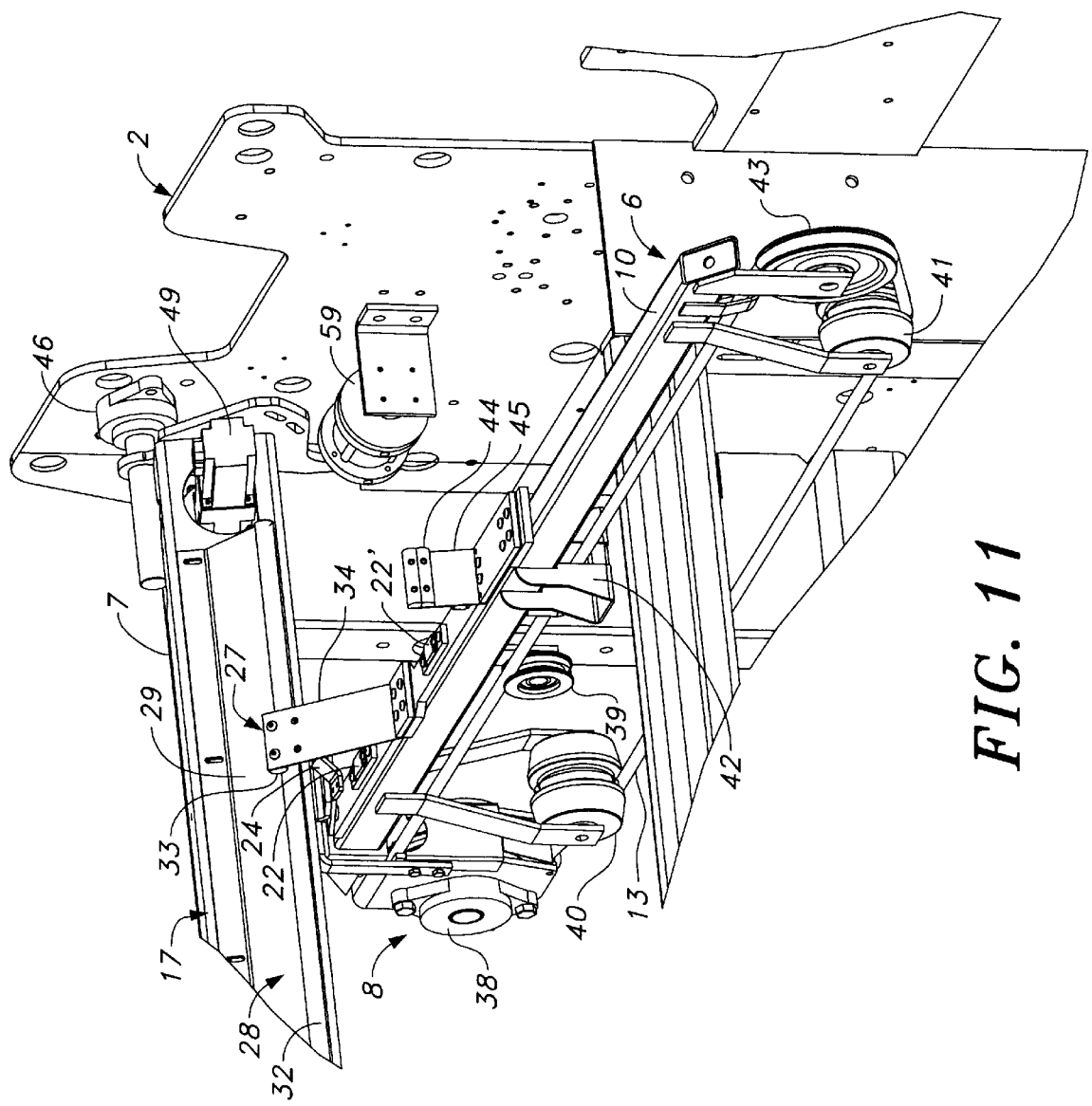
FIG. 11 is a perspective view of a portion of a conveyor and tug assembly illustrated in FIG. 6.

Referring particularly to FIG. 11, upper level conveyors 6 include an arm 10 which supports an adjustable mounting means 8, a drive pulley 11 supported by a drive pulley bearing assembly 38, idler pulley 43, and tension pulleys 39, 40 and 41. Conveyor belts 13, which preferably are circular in cross section, are mounted on the pulleys. A slide projection 42 is mounted on each arm to support the mid section of the arm.

Referring particularly to FIG. 15, a representative lower level conveyor 6' is illustrated which includes an arm 10', which supports an adjustable mounting means 8', a drive pulley 11' supported by a drive pulley bearing assembly 38', and idler pulleys 43', 39' and 40'. Conveyor belts 13' which preferably have a flat contact surface, are mounted on the pulleys. A slide projection 42' is mounted on each arm to support the mid section of the arm. Lower level conveyor first engagement member 16' is mounted on the proximal end of arm 10' and lower level conveyor second engagement member 25' is mounted on the mid portion of arm 10'.

Referring especially to FIGS. 10 and 11, a lock means 27 and a latch means 28 are illustrated for retaining the conveyors 6 and 6' in a set position during the operation of the machine. Lock means 27 includes a first lock member 33 connected to the distal end of a spring arm 34 whose proximal end is connected to conveyor arm 10 by lock mount 51. First lock member 33 may be formed from a threaded member or it may be of any suitable friction material. First lock member 33 is positioned so as to engage first latch bar 32 mounted on the distal end of first latch member 29 whose proximal end is connected to first carrier 7 when first tug assembly 17 is rotated to a lock engaging position as shown in FIGS. 10 and 10A.

To insure that the conveyors remain in a secure locked position during operation of the machine, a second set of lock means and latch means similar to lock means 27 and latch means 28 is provided. A second lock member 44 is connected to the distal end of a spring arm 45 whose proximal end is connected to conveyor arm 10 by lock mount 52. Second lock member 44 may be formed from a threaded member or it may be of any suitable friction material. Second lock member 44 is positioned so as to engage a second latch bar, similar to first latch bar 32 which is mounted on second carrier 7', when second tug assembly 17' is rotated to a lock engaging position by an air cylinder, similar to air cylinder 59 shown in FIG. 11.

Referring to FIGS. 1, 2, 10, 10A, 11, and 12, it may be seen that first carrier 7, a part of first tug assembly 17, is mounted for pivotal rotation on frame 2 by rotatable bearing support 46 and is driven by an air cylinder 59 shown in FIG. 11 which is operatively connected for control by computer controller means 26.

Also a part of first tug assembly 17 is first carrier 7 which carries first slide bar 47 upon which first carriage 18 is mounted as shown in FIG. 12. Second slide bar 47', similar to slide bar 47, is mounted on second carrier 7' upon which the second carriage is mounted. First drive means 37 includes first motor 49 which drives first belt 48 to which first carriage 18 is connected.

Figure 8A:
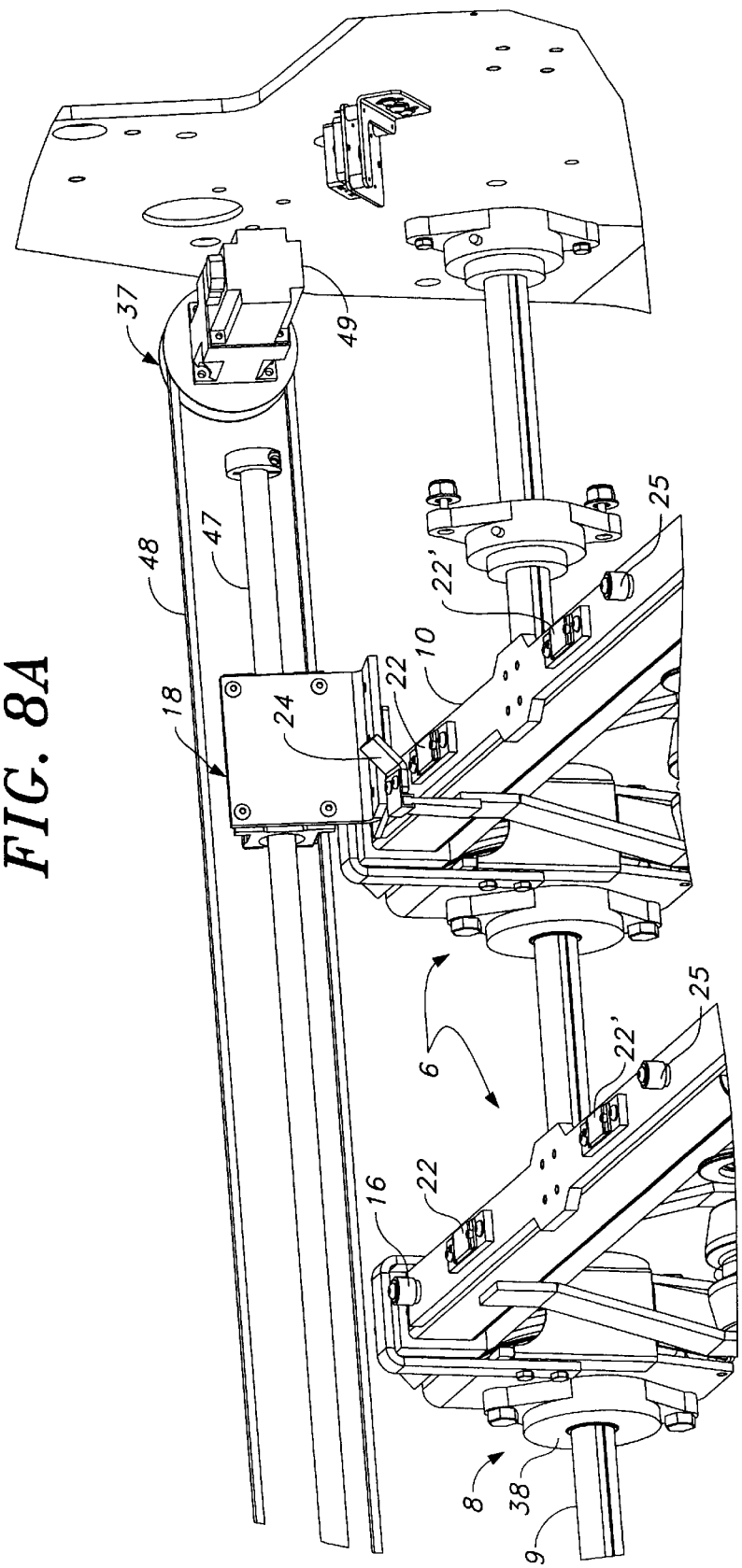
FIG. 8A is an enlarged perspective view of a portion of the top level assembly illustrated in FIGS. 6 and 7.
Figure 9:
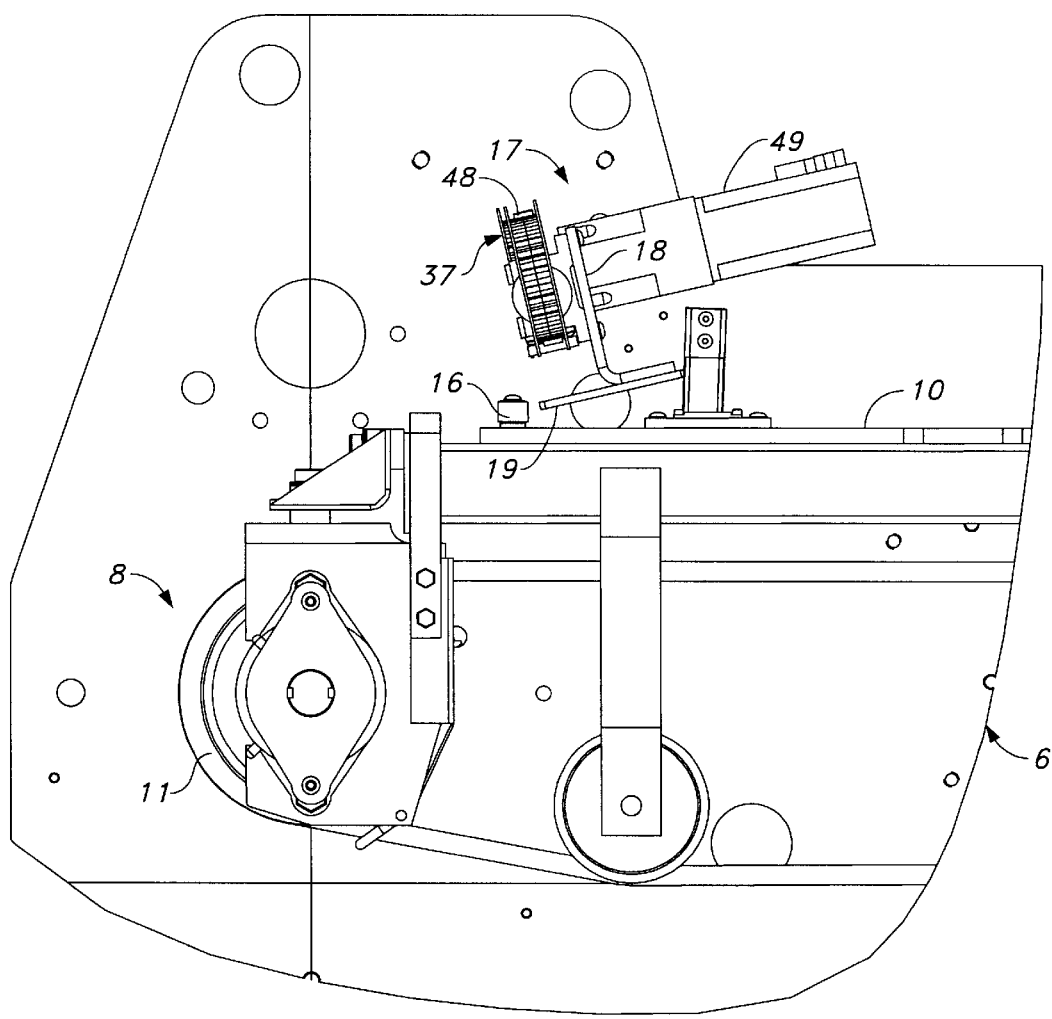
FIG. 9 is an enlarged side view of a portion of a conveyors and tug assembly illustrated in FIG. 6 with portions removed for clarity.

As shown in FIG. 2, the second drive means includes second motor 49' which drives a second belt, similar to first belt 48 illustrated in FIG. 8A, which is connected to the second carriage and which is part of second tug assembly 17'.

Figure 13:
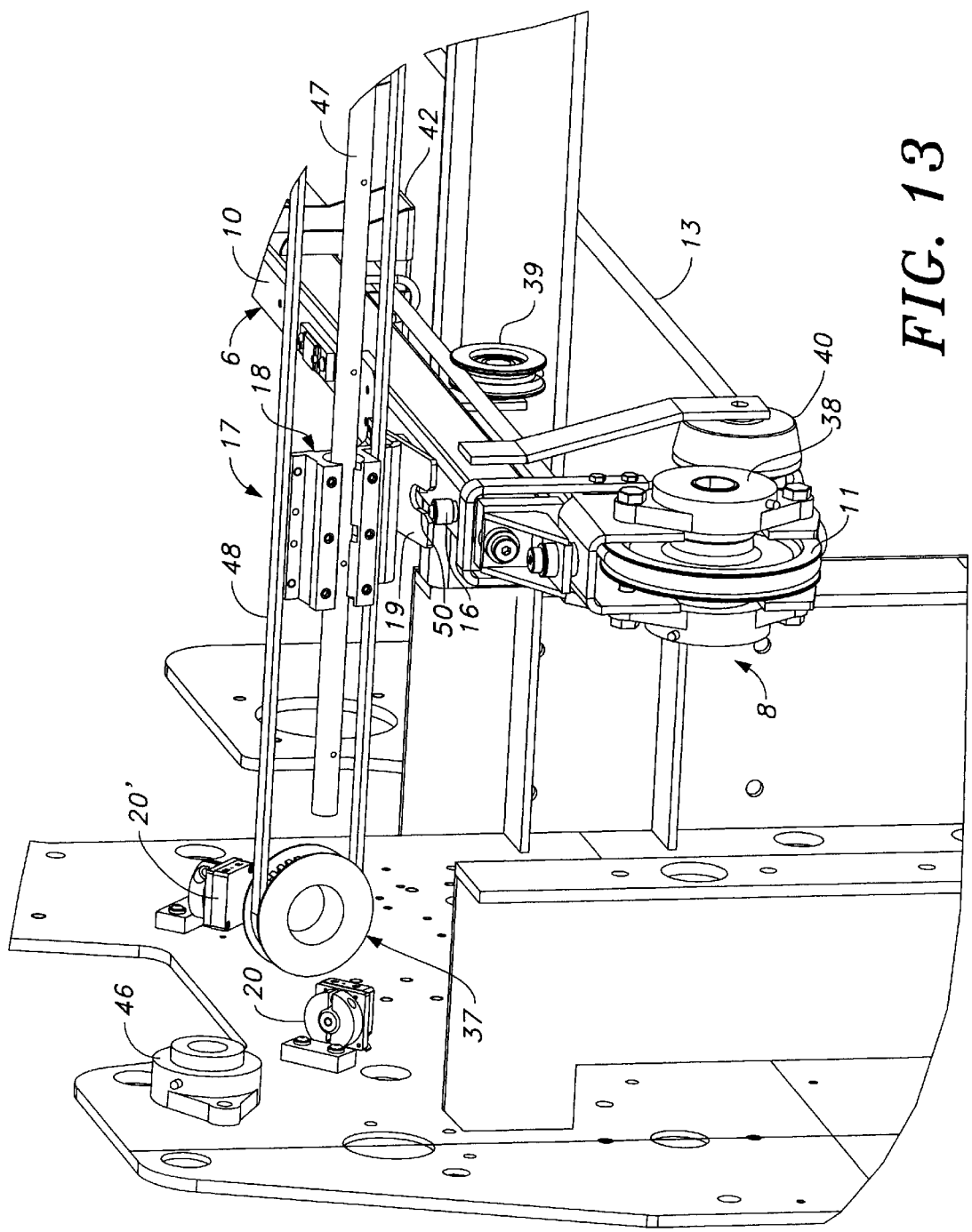
FIG. 13 is a perspective view of a portion of the rear portion of a conveyor illustrating the tug assembly, engagement mechanism and drive pulley bearing assembly shown in FIG. 12.

First carriage 18, as shown in FIGS. 6, 8A, 8B, 9, 10, 10A, 10B, 12, and 13 carries first mirror 24 and first gripper means 19. First gripper means 19 is formed with a slot 50 as shown in FIG. 13 for engaging first engagement member 16. A similarly formed gripper means mounted on the second carriage grips second engagement member 25.

Referring to FIGS. 1 and 2, the construction of the machine is seen with the upper level conveyors 6 in registration with the lower level conveyors. Each upper level conveyor 6 in the preferred form is matched with a lower level conveyor 6', one of which is illustrated in FIG. 15.

Each lower level conveyor 6' includes a drive pulley bearing assembly 38' which is connected to a drive shaft similar to drive shaft 9. Each lower level conveyor 6' is constructed with a drive pulley 11', idler pulley 43', and tension pulleys 40' and 39'.

To lock each lower level conveyor 6' into a set position, each conveyor 6' is constructed with a lock means 27' as illustrated in FIG. 15. Lock means 27' includes a first lower level conveyor lock member 33' attached to a spring arm 34' connected to lock mount 53 which is rigidly connected to arm 10'. First lock member 33' is located to engage a latch bar similar to latch bar 32 located on third tug assembly 17" illustrated in FIG. 1.

Lock means 27' also includes second lower level conveyor lock member 44' connected by spring arm 45' which is connected to lock mount 53. Lock member 44' is positioned so as to engage a latch bar similar to latch bar 32 mounted on fourth tug assembly 17''' illustrated in FIG. 1.

As illustrated in FIGS. 1 and 16, adjacent and parallel pairs of upper level conveyors 6 and lower level conveyors 6' are computer controller operatively linked to convey a single sheet 31 from the receiving end to the delivery end of the layboy machine in the direction shown by arrow 60. When the operator wishes to start a new production run of product, the sheet size, number of sheets 31 in rows 30, and spacing 54 between sheets 31 is entered into the computer controller means 26. The computer controller means 26 then sets the four tug assemblies 17, 17', 17", and 17''' into motion to locate the present positions of all of the conveyors 6 and 6' using the photo eyes 20 and 20', first mirror 24 and the second mirror, and for the upper conveyors, reflector targets 22 and 22', and for the lower conveyors similar equipment is used which is mounted on the frame 2 and third and fourth tug assemblies 17" and 17'''. When all of the present locations have been located; the computer controller means 26 calculates the new positions of the conveyors and signals the four tug assemblies to move the conveyors to the new positions. Specifically, first photo eye 20 as illustrated in FIG. 12 emits a first photo beam 21 which is reflected off mirror 24 onto a first reflector target 22 of one of the conveyors 6. The computer controller means 26 identifies the particular conveyor and determines the new location of first and second engagement members 16 and 25 which determines the direction and extent of lateral movement and angular longitudinal direction of movement of the conveyor required to reach the new calculated position. First drive means 37 is activated and first carriage 18 is moved into position so that first gripper 19 is in alignment with first engagement member 16. First carrier 7 is then rotated from its position shown in FIG. 10A to the position shown in FIG. 10B so that first gripper means 19 engages first engagement member 16. First drive means 37 is once again activated and carriage 18 moves the proximal end of conveyor 6 to the selected lateral position on first drive shaft 9.

The positioning of selected conveyor 6 is completed by second tug assembly 17' acting as follows. Specifically, second photo eye 20' as illustrated in FIG. 12 emits second photo beam 21' which is reflected off the second mirror onto second reflector target 22' of one of the conveyors 6. The computer controller means 26 identifies the particular conveyor and determines the new location of first and second engagement members 16 and 25 which determines the direction and extent of lateral movement and angular longitudinal direction of movement of the conveyor required to reach the new calculated position.

Second drive means on second tug assembly 17' is activated and the second carriage is moved into position so that the second gripper is in alignment with second engagement member 25. Second carrier 7' is then rotated so that the second gripper means engages second engagement member 25. Second drive means is once again activated and the second carriage moves the distal end of conveyor 6 to the selected lateral position on first drive shaft 9.

At the same time that first and second tug assemblies 17 and 17' are moving upper level conveyors 6 into new position, second and third tug assemblies 17" and 17''' are moving lower level conveyors 6' into new positions using photo eyes, mirrors and targets similar to the apparatus just described.

After all of the upper and lower conveyors 6 and 6' have moved into a new position, the computer controller means 26 automatically locks each conveyor into position by rotating first, second, third and fourth tug assemblies 17, 17', 17", and 17''' so that; e.g., first latch bar 32 moves from an unlatched position as shown in FIG. 10B to a latched position as shown in FIG. 10A with latch bar 32 now in near engagement e.g., with first lock member 33.

After all the conveyors are locked into position, motors are activated to rotate the drive shafts for the upper and lower conveyors such as drive shaft 9 to convey sheets 31 to new laterally spaced positions in rows 31 with a different lateral spacing 54 between side edges 55 and 56.

In the preferred form of the present invention, the computer controller means 26 accepts user input of one or more of the number of sheets in rows 30 at the receiving end 4, the size of the sheets 31, the number of conveyors 6 to be assigned to each of the rows 30, the position of the conveyors 6 relative to the side edges 55 and 56 of the sheets 31, and the lateral spacing 54 between the sheets 31 at the delivery end 5 of the conveying means 3. The computer controller means 26 has default values for one or more of the number of sheets in rows 30 at the receiving end 4 of the conveyor means, the size of the sheets 31, the number of conveyors 6 to be assigned to each of the rows 30', the position of the conveyors 6 relative to the side edges 55 and 56 of the sheets 31, and the lateral spacing 54 between the sheets 31 at the delivery end 5 of the conveying means 3. The computer controller means 26 calculates, on the basis of the user input, the default values, or a combination of the user input and the default values, the selected second location of each of the conveyors 6. The computer controller means 26 directs the locating means 36 to locate the first location of each of the conveyors 6. The computer controller means 26 notes the first location of each of the conveyors 6, and the computer controller means 26 directs the tug means 12 to move each of the conveyors 6 to each of the selected second locations.

In the most preferred form of the present invention, the computer controller means 26 accepts user input of one or more of the number of sheets 31 in each row 30 at the receiving end 4, the size of the sheets 31, the number of conveyors 6 to be assigned to each of the rows 30, the position of the conveyors 6 relative to the side edges 55 and 56 of the sheets 31, and the lateral spacing 54 between the sheets 31 at the delivery end 5 of the conveying means 3. The computer controller means 26 has default values for one or more of the number of sheets in rows 30, the size of the sheets 31, the number of conveyors 6 to be assigned to each of the rows 30, the position of the conveyors 6 relative to the side edges 55 and 56 of the sheets 31, and the lateral spacing 54 between the sheets 31 at the delivery end 5 of the conveying means 3. The default values are dependent on user input and complete configuration of the present invention. The computer controller means 26 calculates, on the basis of the user input, the default values, or a combination of the user input and the default values, the selected second location of each of the conveyors 6. The first location of each of the conveyors 6 is its lateral position and angular disposition, or longitudinal direction, before being located; the second selected location of each of the conveyors 6 is its lateral position and angular disposition, or longitudinal direction, after being moved.

In order to locate all of the conveyors 6, the computer controller means 26 directs the first and second photo eyes 20 and 20' to project first and second photo beams 21 and 21' at the first mirrors 24 and the second mirror on the first carriage 18 and the second mirror on the second carriage. The computer controller means 26 activates first drive means 37 and the second drive means, moving the first carriage 18 and the second carriage until the first and second photo beams 21 and 21' are reflected by the first and second reflector targets 22 and 22' on each of the conveyors 6, determining the first location of each of the conveyors 6. The computer controller means 26 notes the first location of each of the conveyors 6. After the location of all of the conveyors 6 are found, conveyors 6 are then moved one at a time.

The computer controller means 26 activates the first drive means 37 and the second drive means, moving the first carriage 18 and the second carriage to the noted location of one of the conveyors 6, pivoting the first and second carriers 7 and 7' to engage the first and second engagement members 16 and 25 with first gripper means 19 and the second gripper means, moving the conveyor 6 to the selected second location, and pivoting the first and second carriers 7 and 7' to disengage the first and second engagement members 16 and 25 from the first and second gripper means 19 and 19' after moving the conveyor 6. These steps, activating the drive means 37 and 37', moving the carriages 18 and 18' until the photo beams 21 and 21' are reflected, pivoting the carriers 7 and 7' to engage the engagement member 16 and 25, moving the conveyor 6 and pivoting the carriers 7 and 7' to disengage the engagement member 16 and 25, are repeated for each of the conveyors 6 to be moved.

In the preferred form of the present invention, the computer controller means 26 is a digital computer, most preferably with a touch-sensitive display for user input. In the preferred form of the invention, the first and second photo eyes 20 and 20' are integrated diode laser and photoreceptor units.

In the preferred form of the invention, first locations and second selected locations are defined by the lateral distances to the first and second reflector targets 22 and 22' and the angle between the first reflector target 22 and the second reflector target 22'.

We claim:

1. In a conveyor autoset layboy machine for receiving a stream of rows of adjacent sheets having side edges and selectively displacing said sheets laterally one from another while conveying said sheets longitudinally of said layboy machine including: a frame, conveying means on said frame having a receiving end and a delivery end; said conveying means including a plurality of conveyors spaced side by side to carry said sheets longitudinally from said receiving end to said delivery end; means to drive said conveyors; the improvement being a computer controller means for controlling the changing of location and the lateral spacing between each of said conveyors and for controlling the changing of the longitudinal direction of each of said conveyors thereby changing the lateral spacing between said sheets in each row comprising;
   a. locating means locating and signaling the first location of each of said conveyors;
   b. computer controller means for receiving said signal from said locating means and noting said first location of each of said conveyors, for receiving a set of instructions, and for controlling the movement of each of said conveyors to selected second locations; and
   c. tug means operably connected to said computer controller means for moving each of said conveyors to said selected second locations.

2. A conveyor autoset layboy machine as described in claim 1 comprising:
   a. said tug means includes a first carrier operably connected to said frame;
   b. lock means mounted on each of said conveyors;
   c. latch means mounted on said first carrier positioned for releasable locking engagement with said lock means mounted on each of said conveyors upon movement of said first carrier from an unlocked position to a locked position.

3. A conveyor autoset layboy machine as described in claim 2 comprising:
   a. said first carrier is pivotally connected to said frame.

4. A conveyor autoset layboy machine as described in claim 1 comprising:
   a. said locating means includes a first photo eye mounted on said frame projecting a first photo beam laterally of said plurality of conveyors;
   b. a first reflector target mounted on each of said conveyors; and
   c. first directing means selectively directing said first photo beam at each of said first reflector targets.

5. A conveyor autoset layboy machine as described in claim 4 comprising:
   a. said first directing means selectively directing said first photo beam at each of said first reflector targets is a mirror.

6. A conveyor autoset layboy machine as described in claim 1 comprising:
   a. said tug means includes a first tug assembly having a laterally movable first carriage;
   b. a first engagement member mounted on each of said conveyors:
   c. first gripper means mounted on said first carriage for releasable selective engagement of said first engagement member of said conveyors; and
   d. mounting means for slidably supporting said conveyors.

7. A conveyor autoset layboy machine as described in claim 6 comprising:
   a. said mounting means includes a drive shaft to power said conveyors; and
   b. said conveyors include an adjustable mounting means operably connected to said drive shaft permitting angular directional movement of said conveyors.

8. A conveyor autoset layboy machine as described in claim 6 comprising:
   a. said tug means includes a second tug assembly longitudinally spaced from said first tug assembly and operably connected to said computer controller means;
   b. said second tug assembly includes a laterally movable second carriage;
   c. a second engagement member mounted on each of said conveyors and spaced from said first engagement member; and
   d. second gripper means mounted on said second carriage for releasable engagement of said second engagement member.

9. A conveyor autoset layboy machine as described in claim 8 comprising:
   a. said first tug assembly includes a first carrier pivotally connected to said frame;
   b. said second tug assembly includes a second carrier operably and pivotally connected to said frame; and c. said first and second tug assemblies include first and second drive means for reciprocally moving said first and second carriages laterally of said conveyors.

10. A conveyor autoset layboy machine as described in claim 9 comprising:
   a. said locating means includes a first photo eye mounted on said frame projecting a first photo beam laterally of said plurality of conveyors; and a second photo eye mounted on said frame and longitudinally spaced from said first photo eye projecting a second photo beam laterally of said plurality of conveyors;
   b. a first reflector target mounted on each of said conveyors and a second reflector target mounted on each of said conveyors longitudinally spaced from said first reflector targets;
   c. a first mirror mounted on said first carriage reflecting said first photo beam from said first photo eye to said first reflector target mounted on said conveyor; and
   d. a second mirror mounted on said second carriage reflecting said second photo beam from said second photo eye to said second reflector target mounted on said conveyor.

11. A conveyor autoset layboy machine as described in claim 8 comprising:
   a. said mounting means for slidably supporting said conveyors includes a drive shaft to power said conveyors;
   b. said conveyors include an adjustable mounting means operably connected to said drive shaft permitting angular directional movement of said conveyors;
   c. a sliding support longitudinally spaced from said drive shaft for supporting the distal ends of said conveyors;
   d. said first tug assembly includes a first carrier pivotally connected to said frame;
   e. said second tug assembly includes a second carrier pivotally connected to said frame;
   f. lock means mounted on each of said conveyors; and
   g. latch means mounted on said first and second carriers positioned for releasable locking engagement with said lock means mounted on each of said conveyors upon movement of said first and second carriers from an unlocked position to a locked position.

12. In a conveyor autoset layboy machine as described in claim 1 wherein said conveying means includes a plurality of upper level conveyors spaced side by side and a plurality of lower level conveyors spaced side by side and arranged in registration with one another to carry said sheets therebetween with each level of conveyors comprising:
   a. said locating means includes upper and lower level locating means, each signaling the first location of each of said upper and lower level conveyors;
   b. said computer controller means receives said signals from said upper and lower locating means, and controls the movement of each of said upper and lower conveyors to selected second locations; and
   c. tug means operably connected to said computer controller means for moving said upper and lower level conveyors to said selected second locations.

13. In a conveyor autoset layboy machine as described in claim 12 wherein each level of conveyors comprises:
   a. said tug means at each of said upper and lower levels includes a first tug assembly having a laterally movable first carriage;
   b. a first engagement member mounted on each of said conveyors;
   c. first gripper means mounted on said first carriage for releasable selective engagement of said first engagement member of said conveyors;
   d. mounting means for slidably supporting said conveyors of said upper and lower levels;
   e. said tug means at each of said upper and lower levels includes a second tug assembly longitudinally spaced from said first tug assembly of each of said levels and operably connected to said computer controller means;
   f. said second tug assembly at each of said upper and lower levels includes a laterally movable second carriage;
   g. a second engagement member mounted on each of said upper and lower conveyors and spaced from said first engagement member; and
   h. second gripper means mounted on each of said second carriages for releasable engagement of each of said second engagement members.

14. In a conveyor autoset layboy machine as described in claim 13 wherein each level of conveyors comprises:
   a. said first tug assembly includes a first carrier pivotally connected to said frame;
   b. said second tug assembly includes a second carrier operably and pivotally connected to said frame;
   c. said first and second tug assemblies include drive means for reciprocally moving said first and second carriages laterally of said conveyors;
   d. said locating means at each of said levels includes a first photo eye mounted on said frame projecting a first photo beam laterally of said plurality of conveyors; and a second photo eye at each of said levels mounted on said frame and longitudinally spaced from said first respective photo eyes projecting second photo beams laterally of said plurality of conveyors;
   e. a first reflector target mounted on each of said conveyors at each of said levels and a second reflector target mounted on each of said conveyors at each of said levels longitudinally spaced from said first reflector targets;
   f. a first mirror mounted on said first carriage at each of said levels reflecting said respective first photo beams from said first photo eyes to said first respective reflector targets mounted on each of said conveyors; and
   g. a second mirror mounted on said second carriage of each of said levels reflecting said second respective photo beams from each of said second photo eyes to said second respective reflector targets mounted on said conveyors.

15. A conveyor autoset layboy machine as described in claim 1, wherein:
   a. said computer controller means accepts user input of one or more of the number of said sheets in each row at the receiving end of said conveying means, the size of said sheets, the number of said conveyors to be assigned to each of said rows, the position of said conveyors relative to said side edges of said sheets, and the lateral spacing between said sheets at said delivery end of said conveying means;
   b. said computer controller means has default values for one or more of the number of said sheets in said rows at said receiving end of said conveyor means, the size of said sheets, the number of said conveyors to be assigned to each of said rows, the position of said conveyors relative to said side edges of said sheets, and the lateral spacing between said sheets at said delivery end of said conveying means;

c. said computer controller means calculates, on the basis of said user input, said default values, or a combination of said user input and said default values, said selected second location of each of said conveyors;

d. said computer controller means directs said locating means to locate said first location of each of said conveyors;

e. said computer controller means notes said first location of each of said conveyors; and f. said computer controller means directs said tug means to move each of said conveyors to each of said selected second locations.

16. A conveyor autoset layboy machine as described in claim 10, wherein:

a. said computer controller means accepts user input of one or more of the number of said sheets in said rows at said receiving end of said conveyor means, the size of said sheets, the number of said conveyors to be assigned to each of said rows, the position of said conveyors relative to said side edges of said sheets, and the lateral spacing between said sheets at said delivery end of said conveying means;

b. said computer controller means has default values for one or more of the number of said sheets in said rows at said receiving end of said conveyor means, the size of said sheets, the number of said conveyors to be assigned to each of said rows, the position of said conveyors relative to said side edges of said sheets, and the lateral spacing between said sheets at said delivery end of said conveying means;

c. said computer controller means calculates, on the basis of said user input, said default values, or a combination of said user input and said default values, said selected second location of each of said conveyors;

d. said computer controller means directs said first and second photo eyes to project said first and second photo beams at said first and second mirrors on said first and second carriages;

e. said computer controller means activates said first and second drive means, moving said first and second carriages until said first and second photo beams are reflected by said first and second reflector targets on each of said conveyors, determining said first location of each of said conveyors;

f. said computer controller means notes said first location of each of said conveyors; and g. said computer controller means activates said first and second drive means, moving said first and second carriages to the noted location of one of said conveyors, pivoting said first and second carriers to engage said first and second engagement members with said first and second gripper means, moving said conveyor to said selected second location, and pivoting said first and second carriers to disengage said first and second engagement members from said first and second gripper means after moving said conveyor.

\* \* \* \* \*